(12) United States Patent
Kando et al.

(10) Patent No.: US 7,835,258 B2
(45) Date of Patent: Nov. 16, 2010

(54) RECORDING MEDIUM, INFORMATION RECORDING AND REPRODUCING METHOD, AND RECORDING AND REPRODUCING APPARATUS

(75) Inventors: Hidehiko Kando, Matsudo (JP); Harukazu Miyamoto, Kodaira (JP); Takeshi Maeda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 32 days.

(21) Appl. No.: 12/155,045

(22) Filed: May 29, 2008

(65) Prior Publication Data
US 2008/0273446 A1 Nov. 6, 2008

Related U.S. Application Data

(63) Continuation of application No. 11/324,275, filed on Jan. 4, 2006, now Pat. No. 7,385,909, which is a continuation of application No. 10/836,274, filed on May 3, 2004, now Pat. No. 7,154,840, which is a continuation of application No. 09/803,975, filed on Mar. 13, 2001, now Pat. No. 6,754,152.

(30) Foreign Application Priority Data

Jan. 19, 2001 (JP) .............................. 2001-011930

(51) Int. Cl.
*G11B 7/24* (2006.01)
(52) U.S. Cl. .................................... 369/275.4
(58) Field of Classification Search .............. 369/275.4, 369/275.3, 44.26
See application file for complete search history.

(56) References Cited

U.S. PATENT DOCUMENTS

| 5,848,050 A * | 12/1998 | Nagasawa et al. | 369/275.4 |
|---|---|---|---|
| 5,870,375 A | 2/1999 | Maeda et al. | |
| 5,872,767 A | 2/1999 | Nagai et al. | |
| 6,069,870 A | 5/2000 | Maeda et al. | |
| 6,269,059 B1 | 7/2001 | Kuroda et al. | |
| 6,603,729 B1 | 8/2003 | Van Den Enden | |
| 6,621,772 B2 * | 9/2003 | Asano et al. | 369/44.26 |
| 6,754,152 B2 | 6/2004 | Kando et al. | |
| 7,154,840 B2 | 12/2006 | Kando et al. | |
| 2002/0118620 A1* | 8/2002 | Lee et al. | 369/275.3 |

FOREIGN PATENT DOCUMENTS

| JP | 05-225580 | 9/1993 |
|---|---|---|
| JP | 07-296389 | 11/1995 |

* cited by examiner

*Primary Examiner*—Thang V Tran
(74) *Attorney, Agent, or Firm*—Mattingly & Malur, P.C.

(57) ABSTRACT

Conventionally, as in the case of switching between a DVD-R and a DVD-RAM, when the method of record mark arrangement in a track is changed, the physical format of the disk is also changed. This makes it difficult to ensure compatibility between pieces of data recorded by a plurality of different methods of record mark arrangement. According to the present invention, sector address data and block address data are recorded in each sector by using wobbling or deformation of a recording groove. Then, depending on which address is used, sector data structure is modified, thereby making it possible to select an address data detection and a data structure on a disk in a single physical format depending on the purpose.

4 Claims, 10 Drawing Sheets

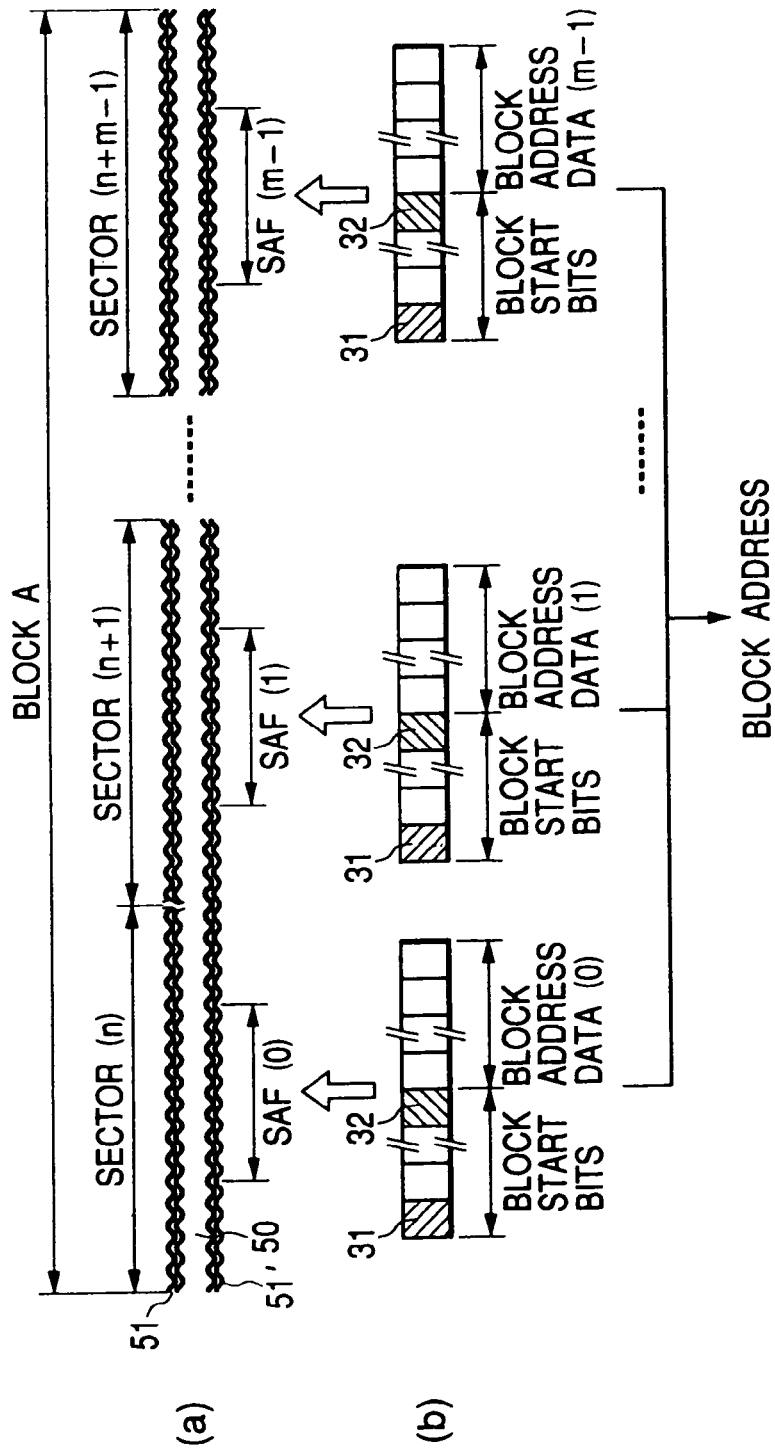

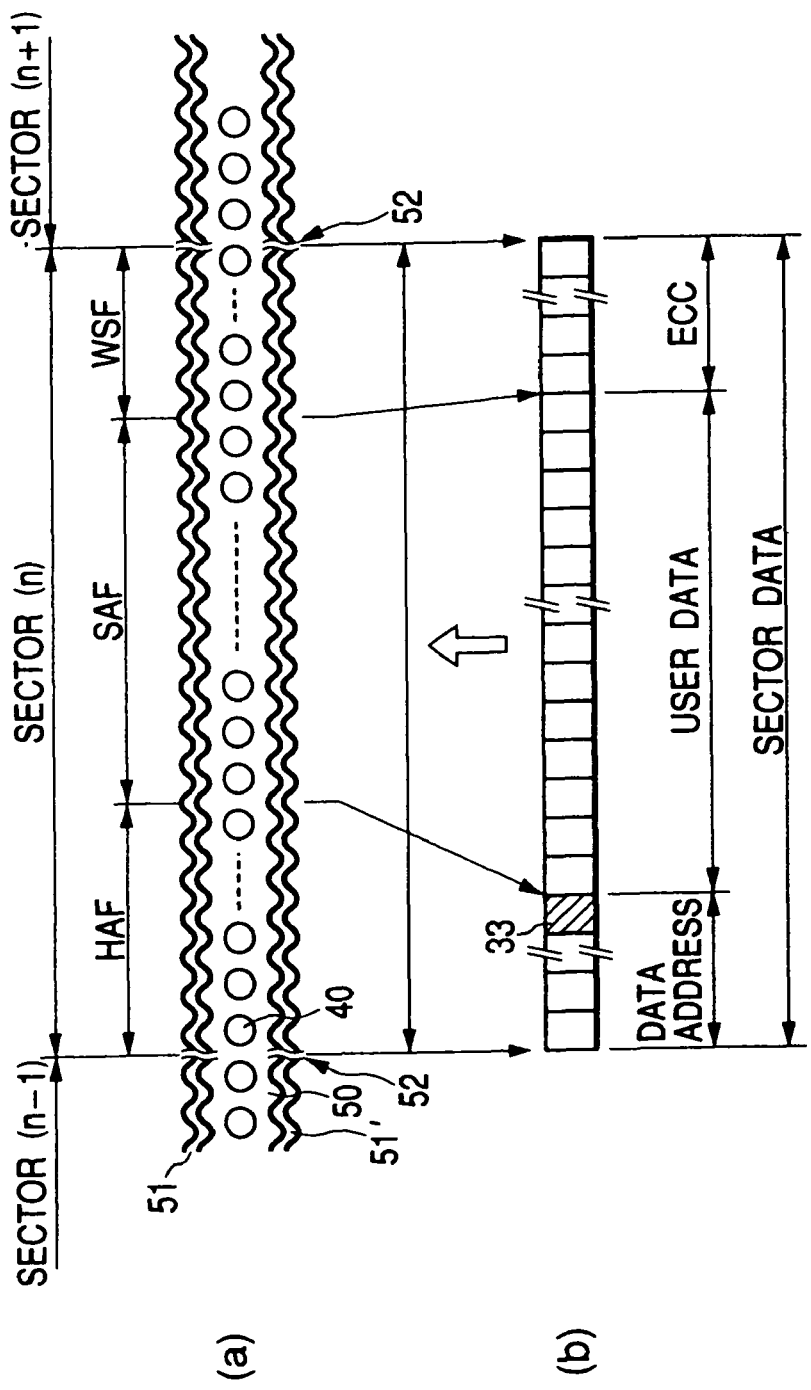

RECORDING MEDIUM, INFORMATION RECORDING AND REPRODUCING METHOD, AND RECORDING AND REPRODUCING APPARATUS

This is a continuation application of U.S. Ser. No. 11/324,275, filed Jan. 4, 2006, now U.S. Pat. No. 7,385,909, which is a continuation application of U.S. Ser. No. 10/836,274, filed May 3, 2004, now U.S. Pat. No. 7,154,840, which is a continuation of U.S. Ser. No. 09/803,975, filed Mar. 13, 2001, now U.S. Pat. No. 6,754,152.

BACKGROUND OF THE INVENTION

1. Field of the Invention

The present invention relates to an information recording medium and an information recording and reproducing apparatus that allow recording of information by irradiation with an energy beam. The present invention relates particularly to an information recording medium that realizes a plurality of methods of record mark arrangement on a substrate in a single format and an information recording and reproducing apparatus that realizes the plurality of methods of record mark arrangement.

2. Related Arts

Information recording and reproducing apparatus heretofore well known include the following two types of apparatus: first, the "DVD Specifications for Rewritable Disc (DVD-RAM) Part 1 PHYSICAL SPECIFICATIONS version 1.0" (November 1998) (hereinafter referred to as an article 1 (DVD-RAM)) and second, the "DVD Specifications for Recordable Disc (DVD-R) Part 1 PHYSICAL SPECIFICATIONS version 1.0" (September 1999) (hereinafter referred to as an article 2 (DVD-R)). DVD-RAM stands for Digital Video Random Access Memory, while DVD-R stands for Digital Video Disc-Recordable.

Sector structure of the article 1 (DVD-RAM) has the following characteristics. A sector of the article 1 (DVD-RAM) has a sector structure with a prepit ID, and a land and a groove forming a recording track meander (wobble). In addition, the sector structure employs an integrated address system in which address information of the sector is disposed at the head of the sector as a prepit. The integrated address is followed by a data field for storing user data; a buffer, a guard, and a VFO field situated before the data field; and a guard and a buffer situated after the data field. Incidentally, a prepit integrated address of DVD-RAM is referred to as a CAPA (Complimentary Allocated Prepit Address).

Sector structure of the article 2 (DVD-R) has the following characteristics. A groove that forms a recording track of a sector of the article 2 (DVD-R) meanders (wobbles), and land prepits are periodically disposed in a land. According to the method of the article 2, the period of wobbling is accurately detected by a groove wobbling signal and a land prepit detection signal, and then timing in recording is determined with reference to the period of wobbling. As for address information, an address of a single ECC block is distributed over 16 sectors, and is recorded as a prepit in a land prepit of each of the sectors within the single ECC block.

According to the typical methods described above, a self-oscillator corrects the phase of a recording clock by detecting a wobbling signal, or a recording clock is generated by frequency conversion of the wobbling signal. Thus, a recording clock dependent on the wobbling signal is generated in some cases.

According to the conventional information recording media and information recording and reproducing methods, when the method of record mark arrangement in a track is changed, the physical format of the disk is also changed, as in the case of switching between a DVD-R and a DVD-RAM, for example. This makes it difficult to ensure compatibility between pieces of data recorded by a plurality of different methods of record mark arrangement.

Specifically, the DVD-RAM has the CAPA, and therefore user data is not provided in a physically continuous arrangement, while the DVD-R has physically continuous user data, as in the case of the DVD-ROM. Therefore, the different methods of record mark arrangement make it impossible to record information on a DVD-RAM medium by the same procedure as that of the DVD-R, for example, and thus make it difficult to ensure compatibility of recorded data.

Moreover, in the examples described above, since frequency of the wobbling detection signal is considerably lower than that of the recording clock, a slight detection error in the wobbling detection signal results in significant errors in the frequency and phase of the recording clock. When such a recording clock is used in recording, record marks to be written are not necessarily written reliably at specified positions on the disk. Therefore, in the case of DVD-RAM, in order to allow for such errors in the recording clock, length of a recording area within a sector is made somewhat longer than that of a recording area actually used for recording, thereby somewhat decreasing its recording density. In the case of DVD-R, data becomes discontinuous at a linking portion, and thereby a linking loss is caused.

SUMMARY OF THE INVENTION

The present invention relates to an information recording medium that realizes a plurality of methods of record mark arrangement on a substrate in a single format and an information recording and reproducing apparatus that realizes the plurality of methods of record mark arrangement, by providing a certain degree of freedom to arrangement and structure of a record mark row within a sector. It is a concept of the present invention to distribute physical addresses (sector address and block address) and thereby set a pre-format. Then, depending on which address is used, sector data structure is modified, thereby making it possible to select an address data detection and a data structure on a disk in a single physical format depending on the purpose.

More specifically, according to a recording and reproducing method of the present invention, a first physical address (a sector address or a block address) is reproduced, and a second physical address (a sector address or a block address) is not reproduced.

Fundamental concepts of main aspects of the present invention will be described in the following.

According to a first aspect of the present invention, the following information recording medium is provided.

An information recording medium for recording information by irradiating a recording track on the recording medium with an energy beam and thereby forming a record mark comprises a sector address included in a unit sector of the recording medium; and a block address which indicates a given address of a given block formed by a plurality of sectors by combining address information included in the individual sectors.

A typical example of an information retaining portion that retains each piece of information forming the above addresses is wobbling or deformation of a track. A recording member based on this typical example may be described as follows. According to a typical aspect of the present invention, there is provided an information recording medium for recording information by irradiating a recording track on the recording medium with an energy beam and thereby forming a record mark, wherein the recording track has wobbling or deformation with a predetermined period, the wobbling or the deformation of the recording track within a unit sector being divided in a temporal direction into a plurality of portions; at least one of the plurality of divided portions of the wobbling or the deformation of the recording track within the unit sector includes address information of a block address; and at least another portion of the plurality of divided portions of the wobbling or the deformation of the recording track within the unit sector includes address information of a sector address.

The wobbling or the deformation of a track is used as an example for later description of concrete structure of a recording medium according to the present invention. However, it is to be understood that the essence of the present invention is not limited to the concrete structure.

The wobbling or the deformation of a track on a recording medium preforms information for addressing by a block unit rather than by a sector unit and information on an address to be recorded in each sector. A format of the former for addressing by a block unit as described above is generally referred to as distributed addressing, because the address is distributed over the block as a unit and thus recorded. A format of the latter is generally referred to as integrated addressing, because address information is recorded in each sector, mostly at the head of the sector. Either of the plurality of addressing methods mentioned above is selected, and user information is recorded on the recording medium according to the format of first recording information and the format of second recording information. It is to be understood that the address information mentioned above includes information on sector structure of the sector. User information to be recorded includes information that specifies which of the addressing methods described above should be used. More specifically, user information includes information indicating that address information is to be extracted from an SAF area or to be extracted from an HAF area in each sector, as will be described later.

Such selection is made typically for the following reasons. The format for addressing by a block unit is suitable as a recording format for current DVD-RW mode, because redundancy of address information recording is at a high level, and therefore few errors will occur in address information. On the other hand, the format in which an address is recorded in each sector is suitable as a recording format for current DVD-RAM mode, because its rate of occurrence of address information errors is not better than the former, but its information recording density per unit recording length is higher.

Thus, with the recording medium according to the present invention, it is possible to preform fundamental address information in wobbling or deformation of a recording track, and to select a recording format suitable for information to be recorded by the user from the recording formats for the plurality of modes mentioned above according to characteristics of the information to be recorded.

According to a second aspect of the present invention, the following information recording and reproducing apparatus is provided.

An information recording and reproducing apparatus comprises a signal detecting circuit for converting a period of a configuration of each record retaining portion on a recording track into an electric signal, the recording track being provided in advance on a recording medium and including the record retaining portion having the configuration with the predetermined period; a block address detecting circuit for detecting a block address by converting a period of the electric signal obtained by the signal detecting circuit; a sector address detecting circuit for detecting a sector address by converting the period of the electric signal obtained by the signal detecting circuit; and an address switching circuit for switching between output of the block address detecting circuit and output of the sector address detecting circuit and thereby transmitting a resulting output to a controller.

BRIEF DESCRIPTION OF THE DRAWINGS

FIGS. 10(a) and 10(b) are diagrams of assistance in explaining a method of reproducing a block address;

FIGS. 11(a) and 11(b) show a relation between a sector structure and information to be recorded;

DETAILED DESCRIPTION OF THE INVENTION

Preferred embodiments of the present invention will hereinafter be described in detail.

Figure 1:
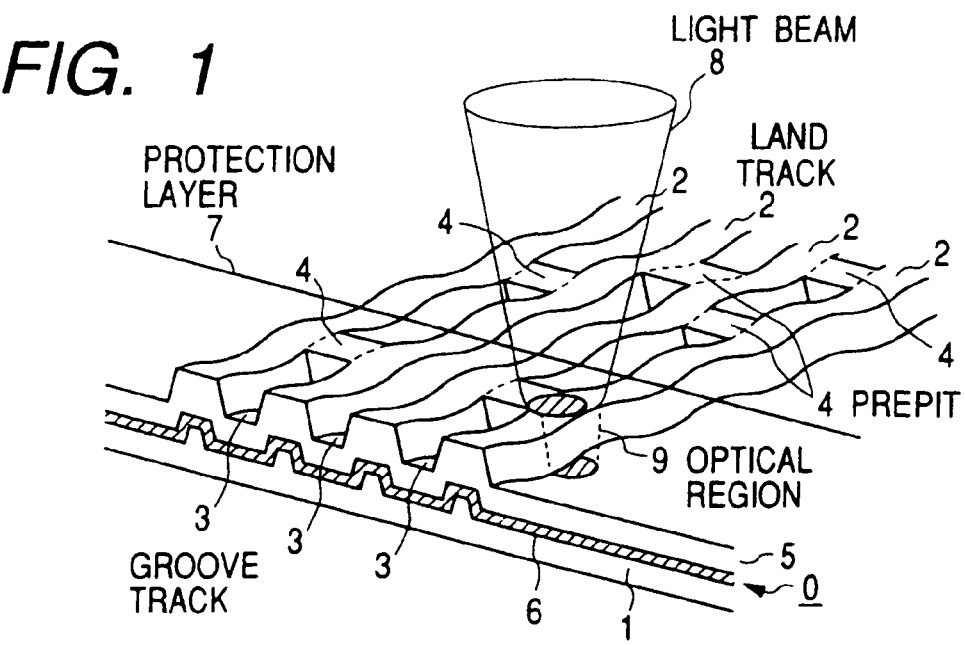
FIG. 1 is a perspective view of fundamental structure of a recording medium according to the present invention.
Figure 2:
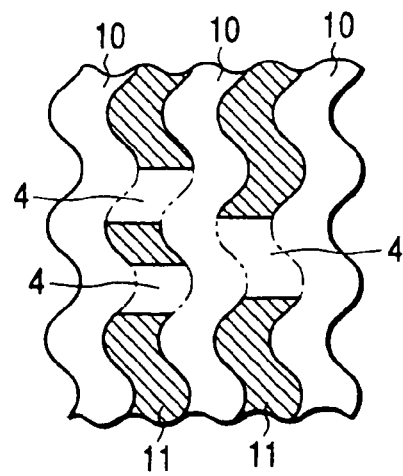
FIG. 2 is a plan view of assistance in explaining wobbling.
Figure 3:
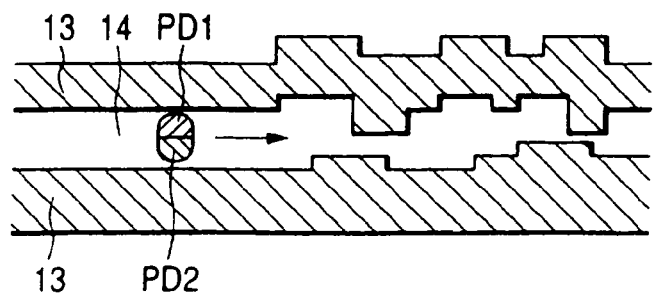
FIG. 3 is a plan view of an example of a deformed recording groove.
Figure 4:
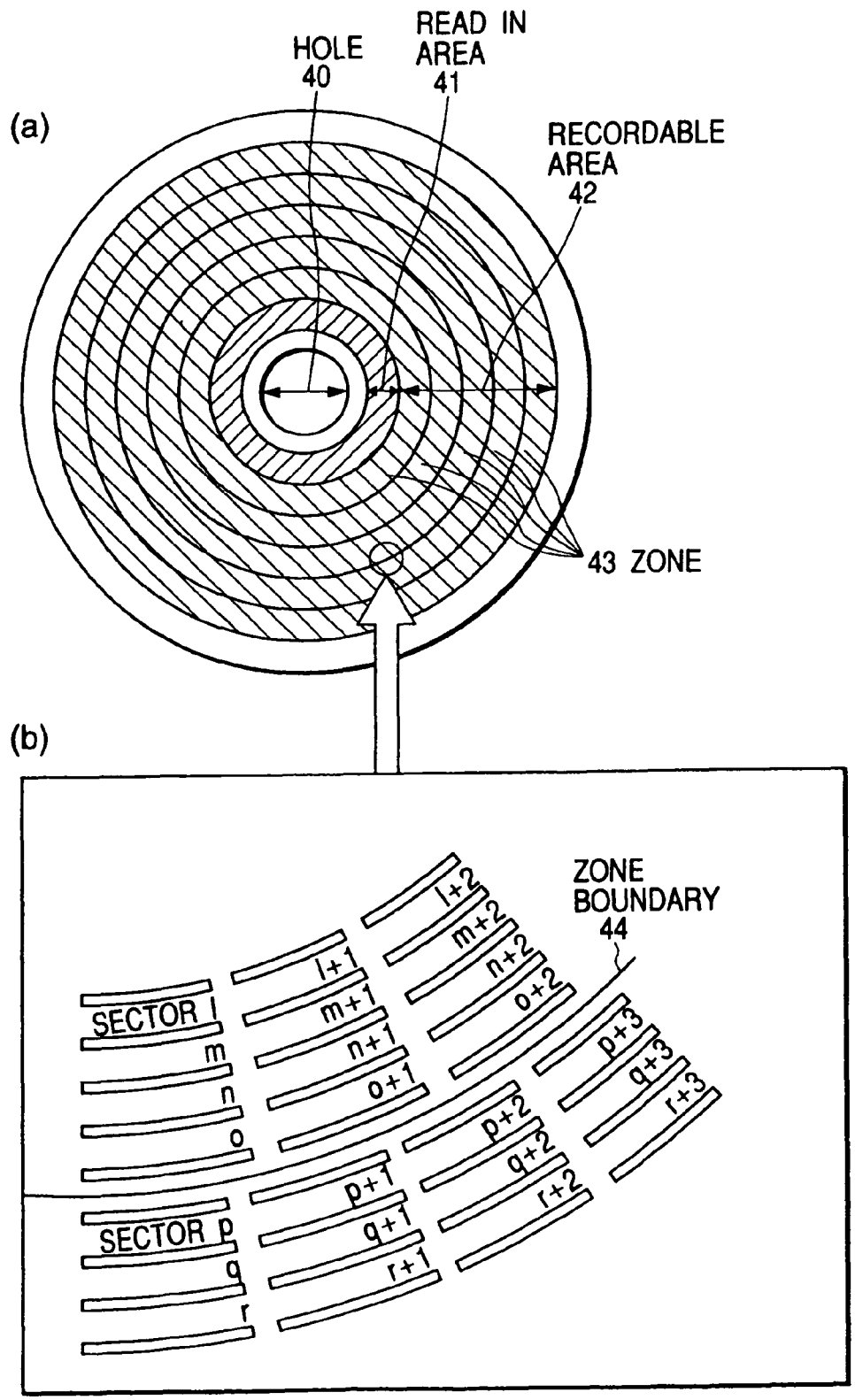
FIGS. 4(a) and 4(b) are plan views of assistance in explaining the entire structure of a disk.
Figure 5:
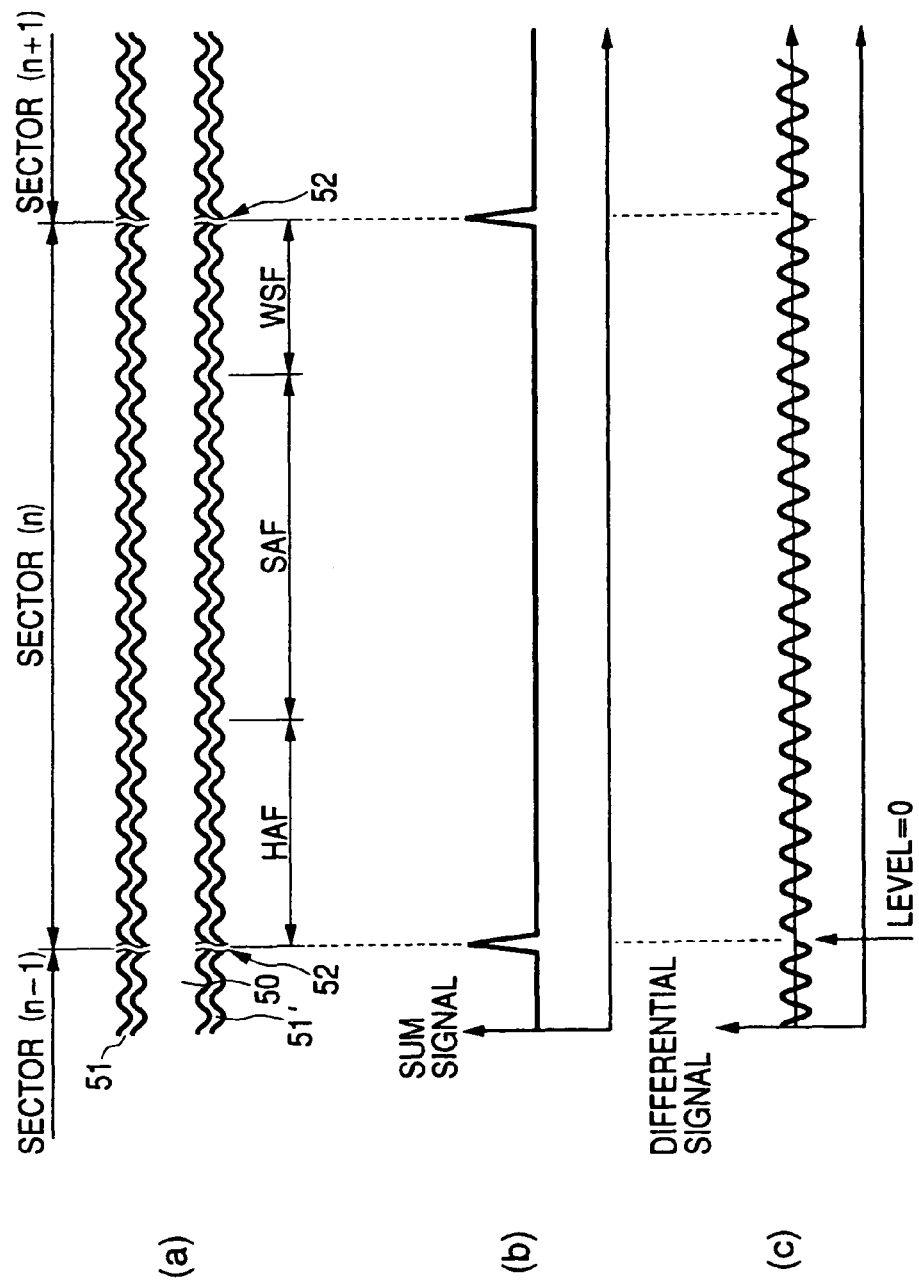
FIGS. 5(a), 5(b), and 5(c) are diagrams for illustrating structure of recorded information in a sector on a recording medium.
Figure 12:
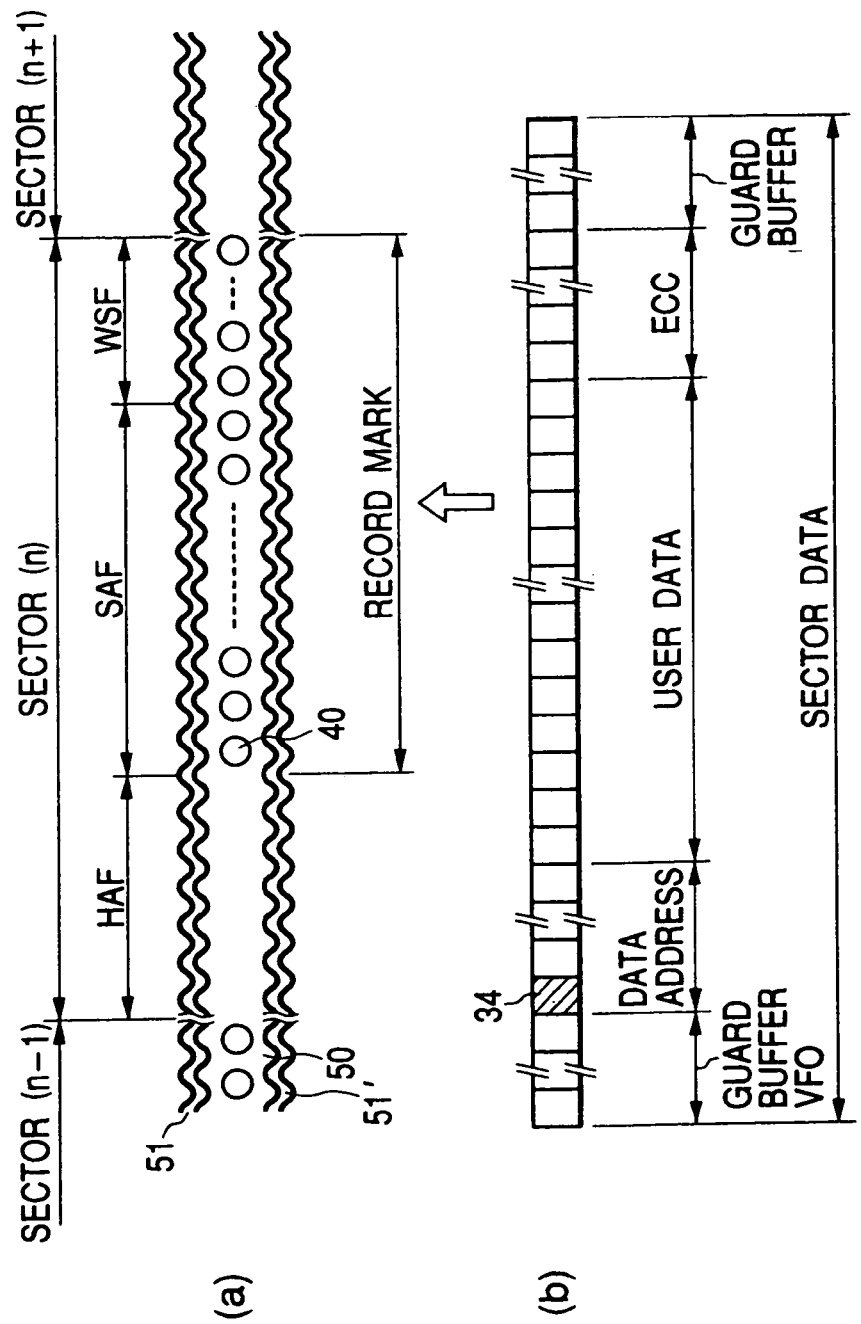
FIGS. 12(a) and 12(b) show a relation different from that of FIGS. 11(a) and 11(b) between a sector structure and information to be recorded.

FIGS. 1 to 3 show examples of physical structure of a recording medium that forms a basis for the present invention. FIG. 1 is a perspective view of a typical example of a recording medium according to the present invention. FIG. 1 shows a structure of a recording layer in a region including tracks for recording information. FIG. 2 is a plan view of assistance in explaining wobbling, and FIG. 3 is a plan view of an example of a deformed recording groove. FIGS. 4(a) and 4(b) are plan views of assistance in explaining structure of the entire recording medium. FIGS. 5 to 12 each show an embodiment of an information recording medium. FIGS. 5(a), 5(b), and 5(c) are diagrams of assistance in explaining a sector structure. FIGS. 6 to 9 are diagrams of assistance in explaining an address information modulating method. FIGS. 10(a) and 10(b) are diagrams of assistance in explaining a block structure. FIGS. 11(a) and 11(b) show a relation between a sector structure and information to be recorded when a block address is used. FIGS. 12(a) and 12(b) show a relation between a sector structure and information to be recorded when a sector address is used.

<Physical Structure of Recording Medium>

First, physical structure of an ordinary disk will be briefly described, and then features of a recording medium according to the present invention will be described in detail. As illustrated in FIG. 1, a recording member 0 is formed with a metal deposition layer 6 and a dye layer, for example, as a recording layer 5 on a substrate 1. An information-writable land track 2 and a groove track 3 are formed on the film record carrier 5. The groove track 3 is adjacent to the land track 2, and plays a role of guiding an energy beam serving as light for reading and recording (writing) of the land track 2, for example a laser beam 8. The groove track 3 is of a concave shape as viewed in a traveling direction of the laser beam 8, and the land track 2 is of a convex shape as viewed in the same direction. Generally, the metal deposition layer 6 is formed as a light reflection plane useful in reflecting the laser beam 8.

The land track 2 is provided with so-called wobbling, and thereby winds so as to form a wave in a direction parallel to the flat surface of the disk at a given frequency. This wobbling allows rotation of the disk to be controlled during the reading of information. The groove track 3 is provided with a prepit 4 that indicates recording control information such as address information indicating a recording position and timing control information for controlling the timing of recording. The land track 2, the groove track 3, wobbling or groove deformation provided to the land track 2 and the groove track 3, and the prepit 4 are formed during production of the disk. During recording of information on the recording medium having such a structure, the optical beam 8 is applied such that the center of the optical beam 8 coincides with the center of the land track 2. Then, pits that correspond to the information are formed on the land track 2. The dimensions of the optical beam 8 are set such that when the land track 2 is irradiated with the optical beam 8, the groove track 3 is also irradiated with part of the optical beam 8. Reference numeral 9 indicates an optical region formed by such irradiation. A signal based on the wobbling mentioned above is detected by using light reflected from the groove track 3, and on the basis of the signal, rotation of the disk is controlled.

FIG. 2 is a plan view of a state of the wobbling as viewed from above. A region for pre-format signal recording in a guide groove formed by a land section 10 and a groove section 11 meanders (wobbles) in a plane along the tracks. The groove section 11 has a prepit 4 for pre-format signal recording, which is formed by leaving an ungrooved section.

"Recording track deformation" as an alternative to wobbling is realized by a method as illustrated in FIG. 3, for example. FIG. 3 is a schematic diagram of a deformed groove as viewed from its top surface. A land section 13 and a groove section 14 are alternately arranged, and according to this method, width of the groove of the groove section 14 or the land section 13 is changed. Then, as in the case of wobbling, a pre-format signal mentioned above is formed by a signal obtained from reflected light of the optical beam 8 applied from above the groove section 14 or the land section 13. In this case, for example, photodetectors PD1 and PD2 are arranged for both sides of the groove to receive light reflected from their respective sides. On the basis of a reflected light signal that corresponds to the deformation of the groove, address reproduction or control can be effected. Thus, the signal system can be handled basically in the same manner as in the case of wobbling. Hence, the following description will be made by taking wobbling as an example, and description for the recording track deformation will be omitted.

A relation between various information to be recorded and physical format will be described in the following. FIGS. 4(a) and 4(b) are plan views of assistance in explaining structure of the entire recording medium. FIG. 4(a) is a plan view of a circular recording medium. FIG. 4(b) is a layout of sectors in the proximity of a zone boundary. In this case, it is assumed that the recording medium is a disk, and the disk is rotated. A clamping hole 40 for clamping the disk is created in the innermost portion of the disk.

Around the periphery of the clamping hole 40, there is a read-in area 41 where physical conditions of the disk and the like are recorded. By reproducing information in this disk region, an information reproducing apparatus can obtain various information indicating conditions for recording various desired information, such as reproducing power appropriate for reproduction, sector structure, defect information, and optimum conditions in recording. On the basis of the information, the information reproducing apparatus can perform proper recording and reproducing operations. It is to be noted that an ordinary system suffices for providing such conditions.

A recordable area 42 is a region for the user or the like to record information. This recordable area is generally divided into a plurality of zones 43, and in the same zone, each sector is positioned in a direction of the radius of the disk so that a mirror portion between sectors is properly formed. FIG. 4(b) shows an arrangement of a plurality of sectors (1, 1+1, 1+2, m, m+1, m+2, . . . ) that are positioned and formed in the same zone. A specific relation between structure of each sector and information to be recorded will be described later with reference to FIGS. 11(a), 11(b), 12(a), and 12(b).

<Wobbling and Recorded Information>

Structure of recorded information will next be described. Recorded information is recorded in an information unit referred to as a sector on a recording track on the recording medium described above. Generally, information recording is made by using an ECC (Error Correction Code) block as a unit. Also, recorded information is recorded so as to form a block that includes a plurality of data sectors. One data sector is formed with at least a data address, user data, and ECC. Of course, the data sector is allowed to have a modified structure that is appropriate to its recording and control method.

FIG. 5(a) shows structure of recorded information in a single sector on the information recording medium. As described above, each sector comprises a recording groove 50 of an appropriate length, and the recording groove is deformed or meanders in a direction intersecting, or for example perpendicular to an extending direction of the recording groove. In the figure, reference numerals 51 and 51' denote wobbling. Also, a mirror portion 52 is formed at the head portion of each sector.

FIG. 5(a) shows structure of recorded information in a sector (n). FIG. 5(b) shows strength of a sum signal when the recorded information is read, while FIG. 5(c) shows strength of a difference signal. In order to facilitate understanding, the sum signal and the difference signal are drawn so as to correspond to positions in the sectors of FIG. 5(a). The sum signal and the difference signal represent a sum of and a difference between the signals of wobbling 51 and 51', respectively. Therefore, in this case, at the mirror portion 52, the sum signal is at the maximum and the difference signal is zero.

The deformation or wobbling may generally be divided into three regions within a single sector. One region is a Header Address Field (abbreviated to HAF), another region is a Sector Address Field (abbreviated to SAF), and the other region is a Wobble Synchronous Field (abbreviated to WSF). Generally, wobbling is subjected to modulation in the HAF and the SAF, while it has a single frequency in the WSF. The recording groove meanders in a different manner in each of the regions. Specifically, in logical terms, the method of modulation of address information is different in each of the regions. A specific example of the plurality of modulation methods will be described later in detail with reference to FIGS. 6 to 9.

Such a recording groove is irradiated with a laser spot, the recording groove is tracked, and the laser spot scans the recording groove in a direction parallel to the recording groove, whereby a sum signal is obtained from a photodetector that detects a total amount of reflected light. The sum signal level transiently rises at the head portion of a sector, but its amount of light varies little within the sector because the recording groove wobbles only weakly. When the photodetector is divided in a direction parallel to the recording groove and a resulting differential signal is observed, the level of the differential signal becomes zero at the head portion of a sector, but otherwise a signal indicating the wobbling of the recording groove is obtained throughout the sector. Thus, it is possible to find the head of the sector by using the sum signal and determine how the recording groove meanders by using the differential signal. This will be understood by referring to FIGS. 5(*a*), 5(*b*), and 5(*c*). Incidentally, the differential signal is at a zero level at the mirror portion 52.

<Examples of Wobbling or Deformation of Recording Groove>

Two methods of wobbling a recording groove will be described with reference to FIGS. 6 to 9. Address information is provided to a recording groove in advance by using these modulation methods. The methods of providing such address information are illustrated in the following.

According to a first aspect of the present invention, there is provided a method characterized in that the wobbling or deformation of a recording track has a plurality of periods, and thereby address information is recorded by using a plurality of period widths including at least a first period width and a second period width.

According to a second aspect of the present invention, there is provided a method characterized in that the wobbling or deformation of a recording track has a plurality of periods and has at least a first region with a first period width and a second region having at least a second period width and a third period width, and thereby address information is recorded by using a plurality of regions comprising the first region and the second region.

In addition, the following method is useful in concrete, practical applications. Specifically, according to a third aspect of the present invention, there is provided a method as set forth in the first aspect, characterized in that address information recorded by using a plurality of period widths including at least the first period width and the second period width is sector address information of the recording medium.

According to a fourth aspect of the present invention, there is provided a method as set forth in the second aspect, characterized in that address information recorded by using a plurality of regions comprising at least the first region having the first period width and the second region having at least the second period width and the third period width is block address information of the recording medium.

Figure 6:
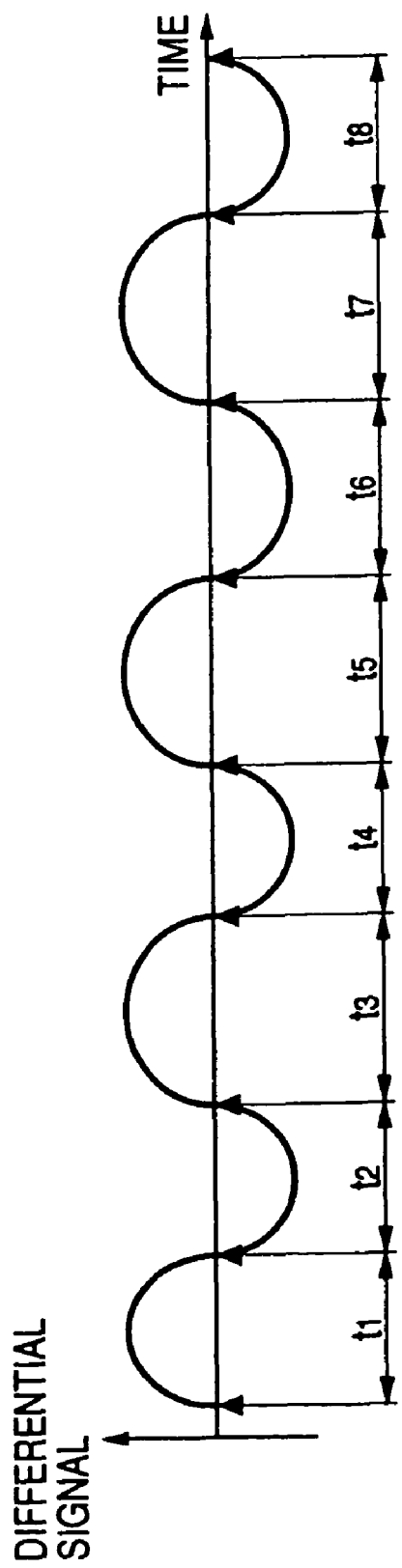
FIG. 6 is a diagram for illustrating a method of modulation for address information.
Figure 7:
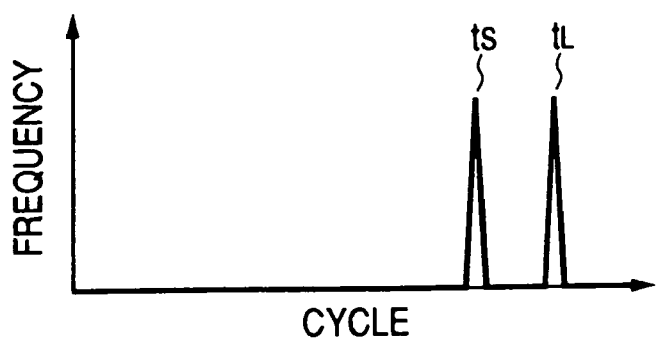
FIG. 7 is a diagram showing a relation between periods and frequency of wobbling obtained by the modulation method of FIG. 6.

These aspects will be described in the following based on concrete examples. FIG. 6 shows an example of wobbling of a recording groove. In FIG. 6, the axis of ordinates denotes differential signal strength, and the axis of abscissas denotes a direction of travel in a sector in the form of time. The differential signal described with reference to FIGS. 5(*a*), 5(*b*), and 5(*c*) is used, and periods of the differential signal are set to be t1, t2, t3 . . . , t8. In this case, for example, the regions of t1, t2, t4, and t8 have a short period, while the regions of t3, t5, t6, and t7 have a long period. The wobbling of the recording groove is adjusted in such a manner that these periods represent tS or tL in a histogram in which the axis of abscissas denotes period and the axis of ordinates denotes frequency. By defining the periods tS and tL of the wobbling of the recording groove as a signal "one" and a signal "zero" (or vice versa), it is possible to record information in the periods of the wobbling of the recording groove. FIG. 7 shows an example of the histogram, in which the axis of abscissas denotes period and the axis of ordinates denotes frequency.

The method of recording information in the recording groove as described above is used in the HAF shown in FIG. 5(*a*). Information in the HAF indicates a sector address of the sector.

Figure 8:
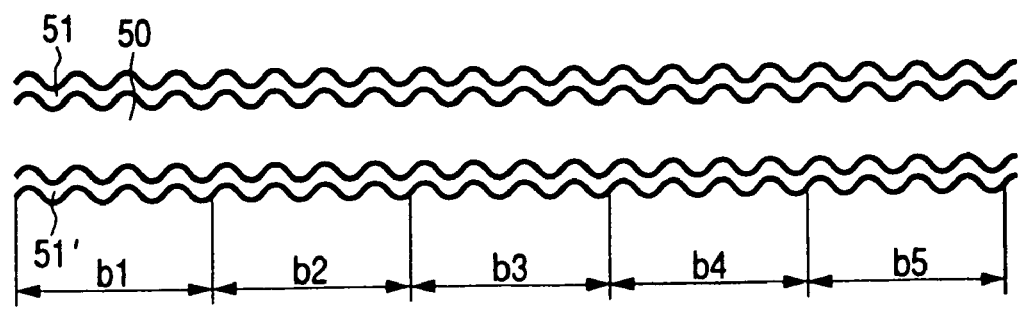
FIG. 8 is a diagram for illustrating an address information modulation method different from that of FIG. 6.
Figure 9A:
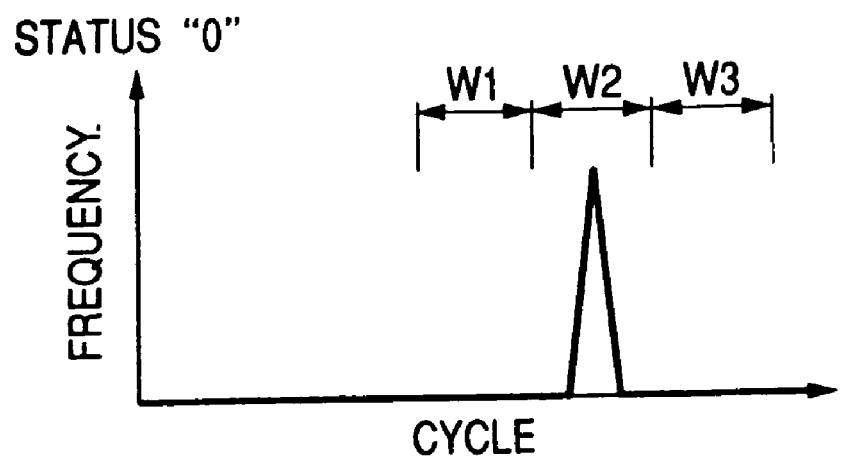
FIGS. 9(a) and 9(b) each show a relation between periods and frequency of wobbling obtained by the modulation method of FIG. 8.
Figure 9B:
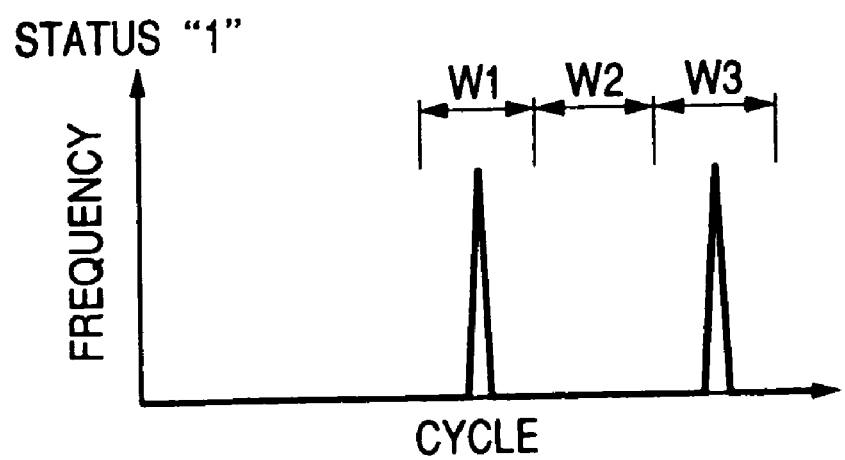

FIG. 8 shows another example of wobbling of a recording groove 50. As in FIG. 5(*a*), reference numerals 51 and 51' denote wobbling. Also in this case, a state of the wobbling is detected by using a differential signal as described with reference to FIG. 5(*c*). The recording groove 50 is divided into appropriately small sections b1, b2, b3, . . . , b5. By defining unvaried periods of the wobbling of the recording groove within such a small section as a signal "zero" and varying periods of the wobbling of the recording groove within a small section as a signal "one," it is possible to record information in the periods of the wobbling of the recording groove. Of course, the signals "one" and "zero" may be defined vice versa. FIGS. 9(*a*) and 9(*b*) each show an example of a state detected on the basis of the periods of the wobbling. In the figures, the axis of abscissas denotes period and the axis of ordinates denotes frequency. An example of wobbling that indicates a frequency in FIG. 9(*a*) has a single period of W2. This state is referred to as a state "zero," for example. An example of wobbling that indicates a frequency in FIG. 9(*b*) has two periods of W1 and W3. This state is referred to as a state "one," for example. It is to be noted that when the signals "one" and "zero" are defined vice versa, the state "one" and the state "zero" of wobbling are of course described vice versa. The method of recording information in the recording groove as described above is used in the SAF shown in FIG. 5(*a*). Information in the SAF indicates a block address of a block that includes the sector. The sector address is a so-called integrated address, and therefore can be reproduced relatively easily. On the other hand, the block address is a so-called distributed address. Therefore, its address information is reproduced by using the entire block. A method of reproducing the block address will next be described.

FIGS. 10(*a*) and 10(*b*) are diagrams of assistance in explaining a data structure for block address reproduction. FIG. 10(*a*) is a diagram showing a relation between the block and sectors. The figure schematically shows a recording groove 50, wobbling 51, and wobbling 51'. FIG. 10(*b*) illustrates block start bits and block address data included in SAFs. It is to be noted that information shown in the SAFs is only that for block address reproduction. Each part drawn in FIG. 10(*b*) corresponds to one of the SAFs in FIG. 10(*a*).

The section of a block A in this example contains m sectors. Physical addresses of the sectors are set to be n, n+1, . . . , n+m−1, respectively. Also, SAFs of the sectors are set to be SAF(0), SAF(1), SAF(2), respectively. Each of the SAFs includes information for the start of block address information (block start bits) and block address data. By obtaining block address data of all the SAFs, the present system reproduces a block address of the block A. More specifically, in the case of the example shown in FIGS. 10(*a*) and 10(*b*), the system obtains all data comprising block address data (0), block address data (1), ..., block address data (m−1), and then reproduces the block address of the block A. This is indicated by a "block address" in FIG. 10(b).

The following is a comparison of features of the recording groove wobbling methods of FIG. 6 and FIG. 8 for recording address information. According to the wobbling method of FIG. 6, the frequency of each of the plurality of periods is detected, and at the same time, the frequency of each of the plurality of periods is controlled to a specified value. According to the wobbling method of FIG. 8, whether a given section of the recording groove has unvaried periods or whether the given section has a plurality of varying periods is detected and the periods are controlled.

In a case where periods are changed in a manner shown in FIG. 6, a large amount of information can be recorded by using a small amount of wobbles, but error tends to occur in address information when the wobbling or the like of the recording groove is physically deformed by rewriting information many times. On the other hand, in a case where periods are changed in a manner shown in FIG. 8, recording of the same amount of information requires a larger amount of wobbles, but because of a high level of redundancy of information recording, error in address information is less likely to occur even when the wobbling of the recording groove is physically deformed by rewriting information many times.

<Provision of Record Marks in Recording Grooves>

Next, two methods of providing record marks in a recording groove will be described with reference to FIGS. 11(a), 11(b), 12(a), and 12(b). FIGS. 11(a) and 11(b) are diagrams of assistance in explaining a positional relation between a recording groove and record marks. FIG. 11(a) schematically shows a positional relation between a recording groove and record marks. FIG. 11(b) illustrates a data structure within a sector. For example, record marks 40 are formed in a sector at a sector address (n). These record marks are formed by using regions of HAF, SAF, and WSF in the sector as desired, whereby information is recorded. Information to be recorded includes an information data address, user data, and error correction code (abbreviated to ECC) mentioned above, for example.

When information is recorded in such a manner, an error in address information in the HAF tends to occur at a relative early stage due to overwriting or the like. On the other hand, an error in address information in the SAF due to overwriting is less likely to occur because of a high level of redundancy of address information recording. Hence, in the case of the record mark layout of FIG. 11(a), it is desirable to access an arbitrary sector by using block address information in SAF, where errors are less likely to occur.

Thus, it is possible to form record marks continuously without impairing continuity of record marks between sectors. It is therefore possible to form record marks that are reproducible even with a simple reproducing system. Incidentally, information indicating that extraction of address information from the sector is to be carried out in SAF may be recorded within the data address.

FIGS. 12(a) and 12(b) are diagrams of assistance in explaining a positional relation between a recording groove and record marks, which relation is different from that of FIGS. 11(a) and 11(b).

Record marks 40 are formed in a sector at a sector address (n). These record marks are formed by using regions of SAF and WSF in the sector, whereby information is recorded. In this case, no information is recorded in an HAF section. Sector data to be recorded includes such information as an information data address, a guard buffer VFO situated before the information data address, user data, error correction code (abbreviated to ECC), and a guard buffer in the last section.

This sector data structure has the same significance as in a DVD-RAM. Since information is not recorded in the HAF section, information in the HAF is correctly reproduced at all times even if record marks are rewritten many times. By recording the address of the sector in the HAF, it is possible to obtain the physical address of the sector prior to user data at all times. Therefore, accessibility to data at a given position is improved, and thereby random access capability is enhanced. Also, since the sector data structure is the same as that in a DVD-RAM, overwrite characteristics are improved. However, since record marks are formed intermittently between sectors, continuous record mark reproduction requires an appropriate timing circuit. Incidentally, information indicating that extraction of address information from the sector is to be carried out in the HAF may be recorded within the data address.

While description has been made about sector data, it is essential in the present invention that address selecting information that specifies which of the block address information and the sector address information in a sector should be chosen be recorded within the sector in the information recording medium. It is also essential that address selecting information that specifies which of the block address information and the sector address information should be used be recorded in the entire recording area of the disk (the address selecting information will be tentatively referred to as entire area address information). Then, on the basis of the address selecting information or the entire area address selecting information, the address switching device is switched to thereby record and reproduce recording information in a desired format. In the case of FIGS. 11(a) and 11(b), for example, address selecting information that specifies the use of a block address is inserted as reference numeral 33 in FIG. 11(b). Similarly, in the case of FIGS. 12(a) and 12(b), address selecting information that specifies the use of a sector address is inserted as reference numeral 34 in FIG. 12(b). Either the block address information or the sector address information is selected by using the information of 33 or 34.

Selection of record mark arrangement in a sector as shown in FIG. 11(a) or FIG. 12(a) depends on the recording medium, the system, and requirements of the user. Technical concepts on which to base such selection will be illustrated in the following.

(1) When a certain amount of similar user data is to be recorded in the same sector, the record mark arrangement of FIG. 11(a) allows intervals between record marks to be wider. Therefore, in the case of a simply made recording medium with a relatively high level of noise, a record mark specifying that the record mark arrangement of FIG. 11(a) be made over an appropriate area of the recording medium is created, and thus the record mark arrangement of FIG. 11(a) is used at all times.

(2) When high random access characteristics in particular are required of the system, it is desirable to use HAF in FIG. 12(a). Thus, the record mark arrangement of FIG. 12(a) is used to meet requirements of the system or the user.

(3) When high overwrite characteristics in particular are required of the system, it is desirable to use HAF in FIG. 12(a). Thus, the record mark arrangement of FIG. 12(a) is used to meet requirements of the system or the user.

(4) When importance is attached to reproduction compatibility with a simply constructed reproducing apparatus that can play back only a recording medium having continuous record marks, the record mark arrangement of FIG. 11(a) is used to meet requirements of the system or the user.

By selecting such recording film arrangements in various other situations as appropriate, information recording suitable for the purpose and with high compatibility can be made with reliability.

As described above, the recording medium according to the present invention allows information recording having high compatibility with a plurality of recording methods to be made with reliability. This means that the present invention allows a DVD-RW format and a DVD-RAM format to be used in a single recording medium.

A specific example of an information recording and reproducing apparatus according to the present invention will next be described. This example can be summarized as follows. Specifically, an information recording and reproducing apparatus which records information by irradiating a recording track on a recording medium with an energy beam and thereby forming a record mark, and is capable of accessing a recording medium provided in advance with a recording track that has wobbling or deformation with a predetermined period comprises a wobble signal detecting circuit for converting the period of the wobbling or the deformation of the recording track into an electric signal; a block address detecting circuit for detecting a block address on the basis of a period of the signal representing the wobbling or the deformation of the recording track obtained by the wobble signal detecting circuit; a sector address detecting circuit for detecting a sector address on the basis of the period of the signal representing the wobbling or the deformation of the recording track obtained by the wobble signal detecting circuit; and an address switching circuit for switching between output of the block address detecting circuit and output of the sector address detecting circuit and thereby transmitting a resulting output to a controller.

Figure 13:
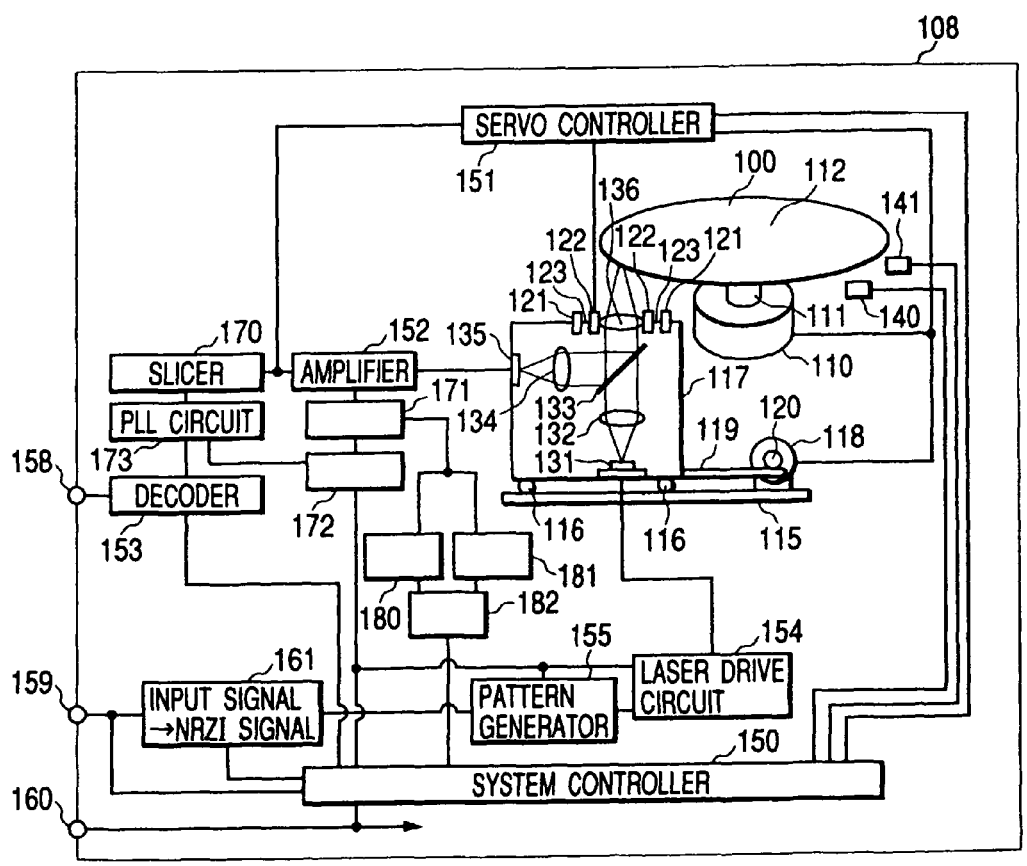
FIG. 13 is a block diagram of an information recording and reproducing apparatus according to an embodiment of the present invention.

FIG. 13 is a block diagram of an information recording and reproducing apparatus according to an embodiment of the present invention. For the purpose of description, FIG. 13 shows a state in which a recording medium 100 is inserted into the information recording and reproducing apparatus. Although the recording medium 100 is essential for information recording and reproduction, the recording medium 100 is extracted from or inserted into the recording and reproducing apparatus as required.

An example of an information recording and reproducing apparatus will hereinafter be described with reference to FIG. 13. The information recording and reproducing apparatus essentially has a mechanism for moving an information recording medium, an optical system for irradiating the recording medium with light, and an electric system for driving the mechanism and the optical system. The optical system is mostly housed in a case 117, and a moving mechanism supporting the case allows the recording medium to be irradiated with light in a desired manner.

As a fundamental configuration for information recording and reproduction, the recording and reproducing apparatus has an energy beam generator, a power adjusting mechanism for adjusting a power level of an energy beam generated by the energy beam generator, a holding mechanism capable of holding the recording medium, a moving mechanism for irradiating the recording medium with the energy beam and moving the energy beam relatively to the recording medium, and a detector for detecting the energy beam reflected or transmitted in the information recording and reproducing apparatus.

First, the section of the mechanism for moving the recording medium will be described. A motor 110 is attached to a casing 108, and a chucking mechanism 112 is attached to a rotation spindle 111 of the motor 110. The chucking mechanism 112 holds the recording medium 100. Therefore, the chucking mechanism 112 serves as a mechanism for holding the recording medium 100. The motor 110, the rotation spindle 111, and the chucking mechanism 112 form a moving mechanism for moving the recording medium 100 and the energy beam relatively to each other.

A rail 115 is attached to the casing 108. A rail guide 116 guided by the rail 115 is attached to the case 117. A linear gear 119 is attached to the case 117, and a rotary gear 120 is attached to the linear gear 119. The case 117 is moved linearly along the rail 115 by transmitting rotation of a rotary motor 118 attached to the casing 108 to the rotary gear 120. The direction of the linear motion of the case 117 is substantially the direction of the radius of the recording medium 100.

The optical system will next be described. A magnet 121 is attached to the case 117 housing the optical system. Also, an objective lens 136 is attached to the case 117 in a direction substantially normal to the recording surface of the recording medium 100. The objective lens 136 is attached to the case 117 via a suspension 123 that is capable of moving substantially in only two directions of the radius of the recording medium 100. Also, a coil 122 is attached to the objective lens 136 so as to be substantially opposed to the magnet 121. Effects of magnetic force resulting from a current flowing through the coil 122 allow the objective lens 136 to move in two directions, that is, a direction substantially normal to the recording surface of the recording medium 100 and substantially a direction of the radius of the recording medium 100. The rail 115, the rail guide 116, the case 117, the magnet 121, the suspension 123, the coil 122, and the objective lens 136 form a positioning mechanism for positioning the energy beam at a specified position on the recording medium 100.

A semiconductor laser 131 serving as the energy beam generator is attached to the case 117. The energy beam emitted from the semiconductor laser 131 passes through a collimating lens 132, a beam splitter 133, and then the objective lens 136. Part of the light emitted from the objective lens 136 is reflected by the recording medium 100, passed through the objective lens 136, reflected by the beam splitter 133, and collected by a detecting lens 134, whereby intensity of the resulting light is detected by a photodetector 135. A light receiving area of the photodetector 135 is divided into a plurality of areas. Light intensity detected in each of the light receiving areas is amplified by an amplifier 152 and also subjected to arithmetic operation, whereby information on positional relation between a light spot collected by the objective lens 136 and the recording medium 100 (servo signal) and an information read signal are detected. The servo signal is sent to a servo controller 151. The read signal is sent to a decoder 153 via a slicer 170 for converting the signal into binary code and a phase lock loop (abbreviated to PLL) circuit 173.

Fundamental operation of the information recording and reproducing apparatus will next be described. The recording medium 100 is mounted in the information recording and reproducing apparatus, and the chucking mechanism 112 secures the recording medium 100. A detector 140 is activated by securing the recording medium 100, and then a resulting signal is sent to a system controller 150. In response to the signal, the system controller 150 controls the motor 110 so as to rotate the recording medium 100 at an appropriate rotation speed. The system controller 150 also controls the rotary motor 118 to position the case 117 to an appropriate position.

In addition, the system controller 150 effects control so as to emit light from the semiconductor laser 131, operate the rotary motor 118 by operating the servo controller 151, and position a focal spot formed by the objective lens 136 at a specified position on the recording medium 100 by passing a current through the coil 122. The servo controller 151 sends to the system controller 150 a signal indicating that the focal spot is formed on the recording medium 100. The system controller 150 gives the decoder 153 an instruction to decode a read signal. When a track being read is not an information track of a control data zone, the system controller 150 instructs the servo controller 151 to position the focal spot on the information track of the control data zone. As a result of the above operations, the system controller 150 reads an information track in a read-in area, thus reading information on recording and reproduction of the medium.

When an instruction to write information or information to be written is sent from a host controller to the system controller 150 via an input connector 159, the system controller 150 instructs the servo controller 151 to position the focal spot on an appropriate track on the recording medium 100.

A signal obtained at the photodetector 135 is amplified by the amplifier 152, and then sent to a wobble detecting circuit 171. A recording track is provided with desired wobbling or deformation, and the wobble detecting circuit 171 detects the period of the wobbling or the deformation. The wobbling or the deformation of the recording track is provided according to the techniques described with reference to FIGS. 1 to 7.

A period signal obtained by the detection of the wobble detecting circuit 171 is subjected to frequency (period) conversion by a frequency converting circuit 172 to be used as a clock for recording and reproduction. A conversion factor of the frequency converting circuit 172 is adjusted according to whether the record mark arrangement of FIG. 5(a) or the record mark arrangement of FIG. 6 is used.

The signal from the wobble detecting circuit is sent to a block address detecting circuit 180 and a sector address detecting circuit 181, whereby each of the circuits provides an address signal. An address switching circuit 182 chooses one from the address signals of the circuits, which depends on sector structure information included in a data address. Alternatively, the user or the system forcefully chooses one from the address signals. According to selected address information, the focal spot is positioned to a given sector on the recording medium 100.

Information to be written goes through a signal processing circuit 161 to be converted into an NRZI signal. The signal converted into the NRZI signal is sent to a pattern generating circuit 155. According to a method of record mark arrangement within a sector specified by the system controller 150, the pattern generating circuit 155 makes (1) a pattern of an area of user data to be recorded within the sector, (2) a record mark arrangement to be attached before the user data area (buffer and other fields), (3) a record mark arrangement to be attached after the user data area (buffer and other fields), and the like. The pattern generating circuit 155 thereby completes a row of patterns of record mark arrangement within the sector. A sector data structure as shown in FIG. 11(b) or FIG. 12(b) is completed according to the record mark arrangement of FIG. 11(a) or the record mark arrangement of FIG. 12(a), respectively.

The pattern generating circuit 155 is supplied with the fundamental clock for recording and reproduction generated by the frequency converting circuit 172. The pattern generating circuit 155 sequentially sends individual recording patterns that it created to a laser driver circuit 154 in synchronism with the recording and reproducing clock. The laser driver circuit 154 generates a writing pulse according to a record mark pattern to be written that is sent from the pattern generating circuit 155 and in synchronism with the recording and reproducing fundamental clock generated by the frequency converting circuit 172. The writing pulse is sent to the semiconductor laser 131 to thereby drive the semiconductor laser 131. The semiconductor laser 131 thereby emits light, and an amount of emission energy of the semiconductor laser 131 is temporally modulated according to the information to be written. The emitted light is applied through the collimating lens 132 and the objective lens 136 to the recording medium 100, whereby record marks are formed on the recording medium.

In a case where record marks are formed by using change in the intensity of light applied to the recording medium, as in a DVD-RAM and an optical modulation type magneto-optical disk, information to be recorded ultimately appears as change in the driving current for the semiconductor laser 131, and the change in the driving current is in synchronism with the fundamental wave of the recording and reproducing clock. In the case of a magnetic field modulation type magneto-optical disk, the driving current for the semiconductor laser 131 is in synchronism with the fundamental wave of the recording and reproducing clock and thus modulated at fixed periods, and the strength and direction of an external magnetic field applied to a portion of the recording medium are modulated according to the information to be recorded and changed in synchronism with the fundamental wave of the recording and reproducing clock.

In the above example, the wobble period detected by the wobble detecting circuit 171 is used to generate the fundamental wave of the recording and reproducing clock. The wobble period detected by the wobble detecting circuit 171 may be used not only to generate the fundamental wave of the recording and reproducing clock but also to control the rotation speed of the spindle motor 110.

When an instruction to reproduce information is sent from the host controller to the system controller 150 via the input connector 159, the system controller 150 instructs the servo controller 151 to position the focal spot on an appropriate track on the recording medium 100. A signal obtained at the photodetector 135 is amplified by the amplifier 152, and then sent to the wobble detecting circuit 171 and the slicer 170. The wobble detecting circuit 171 detects the period of wobbling or deformation of the recording track. A signal from the wobble detecting circuit is sent to the block address detecting circuit 180 and the sector address detecting circuit 181, whereby each of the circuits provides an address signal. The address switching circuit 182 chooses one from the address signals of the circuits, which depends on sector structure information included in a data address. Alternatively, the user or the system forcefully chooses one from the address signals. According to selected address information, the focal spot is positioned to a given sector on the recording medium 100. The period signal obtained by the detection of the wobble detecting circuit 171 is subjected to frequency (period) conversion by the frequency converting circuit 172 to be used as a fundamental wave of a recording and reproducing clock. The conversion factor of the frequency converting circuit 172 is changed according to information indicating the type of data structure recorded in the data address or the type of data structure written in control data. The fundamental wave of the recording and reproducing clock generated by the frequency converting circuit 172 is inputted to the PLL circuit 173. The PLL circuit 173 is oscillated by itself at the same frequency as that of the fundamental wave of the recording and reproducing clock. The PLL circuit can adjust a phase relation between the fundamental wave of the recording and reproducing clock provided by the frequency converting circuit 172 and its self-oscillating wave, and thus adjusts the phase of the self-oscillating wave to thereby generate a reproducing clock. The phase of the self-oscillating wave is adjusted in such a way that the reproducing clock is synchronized with a binary reproduction signal obtained by the slicer 170 in a most desirable manner. The reproducing clock and the binary reproduction signal are sent from the PLL circuit to the decoder 153 to decode recorded data, and then read information is sent to the host controller via an output connector 158.

In the above example, the wobble detection signal is subjected to frequency conversion to generate the fundamental wave of the recording and reproducing clock and to thereby obtain the reproducing clock. However, for reproduction, a method of reproducing a reproducing clock by using only a reproduction signal of recorded data instead of using the wobble detection signal is also conceivable. In addition, the wobble period detected by the wobble detecting circuit 171 may be used to control the rotation speed of the spindle motor 110.

Incidentally, power is supplied to the system controller and other parts via a terminal 160.

Thus, according to the embodiment shown in FIG. 13, the number of channel bits within a unit sector is made variable and changed as required, and thereby it is possible to realize a recording and reproducing apparatus that can adapt different record mark arrangements within sectors to a recording medium in a single format. It is therefore possible to construct an information recording apparatus that can reliably record information at all times.

The information recording method or the information recording apparatus for recording information on a recording medium by energy irradiation renders sector data structure within a sector variable, and allows selection between a data structure using a sector address and a data structure using a block address.

According to the present invention, it is possible to suitably and selectively choose a method of arranging record marks within a sector on a disk in a single substrate format. This makes it possible to produce a recording medium suited for a purpose more readily and to increase compatibility between pieces of recorded information written by a plurality of methods of record mark arrangement. Thus, it is possible to readily record and reproduce data with high reliability.

The recording medium and the recording and reproducing method according to the present invention make it possible to select a plurality of address data detections and data structures on a disk in a single physical format depending on the purpose. In addition, the recording and reproducing apparatus according to the present invention makes it possible to simply and readily perform recording and reproduction by a plurality of address systems employed in a disk.

In order to facilitate understanding of the drawings, main reference numerals are listed in the following.

100 . . . recording medium, 108 . . . casing, 110 . . . motor, 111 . . . rotation spindle, 112 . . . chucking mechanism, 115 . . . rail, 116 . . . rail guide, 117 . . . case, 118 . . . rotary motor, 119 . . . linear gear, 120 . . . rotary gear, 121 . . . magnet, 122 . . . coil, 123 . . . suspension, 131 . . . semiconductor laser, 132 . . . collimating lens, 133 . . . beam splitter, 134 . . . detecting lens, 135 . . . photodetector, 136 . . . objective lens, 140 . . . detector, 150 . . . system controller, 151 . . . servo controller, 152 . . . amplifier, 153 . . . decoder, 154 . . . laser driver circuit, 155 . . . pattern generating circuit, 158 . . . output connector, 159 . . . input connector, 161 . . . signal processing circuit, 170 . . . slicer, 171 . . . wobble detecting circuit, 172 . . . frequency converting circuit, 173 . . . PLL circuit, 180 . . . block address detecting circuit, 181 . . . sector address detecting circuit, and 182 . . . address switching circuit.

What is claimed is:

1. An information recording medium for recording information having a wobbling recording track, comprising, as a physical format:
    a block;
    a first field in said block with first wobble;
    a second field in said block with second wobble; and
    a third field in said block with third wobble,
    wherein a block address of said block is represented by using address information of plural said second fields.

2. An information recording medium according to claim 1, wherein a degree of first modulation of said first wobble and a degree of second modulation of said second wobble are different from each other.

3. An information recording medium according to claim 1, wherein said first field is a header field, said second field is a sector address field, and said third field is a wobble synchronous field.

4. An information recording medium according to claim 1, wherein a period of said first wobble, said second wobble and said third wobble are different from each other.

* * * * *